(12) United States Patent
Li

(10) Patent No.: US 11,985,957 B1
(45) Date of Patent: May 21, 2024

(54) BIRD FEEDING MONITORING HOUSE

(71) Applicant: Zheng Li, Guangdong (CN)

(72) Inventor: Zheng Li, Guangdong (CN)

( * ) Notice: Subject to any disclaimer, the term of this patent is extended or adjusted under 35 U.S.C. 154(b) by 0 days.

(21) Appl. No.: 18/346,121

(22) Filed: Jun. 30, 2023

(51) Int. Cl.
| | | |
|---|---|---|
| *A01K 39/01* | (2006.01) | |
| *A01K 29/00* | (2006.01) | |
| *A01K 39/012* | (2006.01) | |
| *A01K 39/02* | (2006.01) | |
| *H04N 23/57* | (2023.01) | |

(52) U.S. Cl.
CPC ........ *A01K 29/005* (2013.01); *A01K 39/0113* (2013.01); *A01K 39/012* (2013.01); *A01K 39/0206* (2013.01); *H04N 23/57* (2023.01)

(58) Field of Classification Search
CPC .............. A01K 39/012; A01K 39/0206; A01K 29/005; A01K 39/0113; A01K 39/026; A01K 39/04

See application file for complete search history.

(56) References Cited

U.S. PATENT DOCUMENTS

| | | | |
|---|---|---|---|
| 7,234,418 B2 | 6/2007 | Fort, II et al. | |
| 8,307,785 B2 * | 11/2012 | Zimmerman | A01K 5/02 119/51.02 |
| 9,750,229 B2 * | 9/2017 | Stewart | A01K 5/0283 |
| 10,201,150 B1 * | 2/2019 | Cottle | A01K 5/0291 |
| 10,212,921 B1 * | 2/2019 | Plemmons | H04N 7/188 |
| 10,398,127 B2 * | 9/2019 | Hu | A01K 5/0283 |
| 10,499,618 B2 * | 12/2019 | Klein | H04N 7/188 |
| 10,806,122 B1 * | 10/2020 | Torres | A01K 5/0291 |
| 11,160,253 B2 * | 11/2021 | Mundell | G06T 7/20 |
| 11,684,037 B2 * | 6/2023 | Clarke | B65D 83/0072 119/57 |
| 2015/0272084 A1 | 10/2015 | Stone et al. | |
| 2022/0287278 A1 | 9/2022 | Carter et al. | |
| 2023/0027590 A1 | 1/2023 | Hu | |

FOREIGN PATENT DOCUMENTS

WO       2017120122 A1    7/2017

* cited by examiner

*Primary Examiner* — Yvonne R Abbott-Lewis

(57) ABSTRACT

The present utility model discloses a bird feeding monitoring house. The bird feeding monitoring house comprises a main body and a feeding portion arranged under the main body, wherein a liquid storage area in communication with the feeding portion is formed in the main body, the main body is provided with a cavity having a shape adapted to a camera, the camera is detachably arranged in the cavity of the main body in a penetrating manner, and a photographing area of the camera comprises at least a part of the feeding portion. According to the present utility model, the camera is detachably arranged in the cavity of the main body in a penetrating manner. When the camera needs to be cleaned or the battery of the camera needs to be replaced, the camera only needs to be pulled out of the cavity without removing the main body from the hanging or installation position; and after camera cleaning or battery replacement is completed, the camera is inserted into the cavity again, so that the operation is simple, and the detachment is convenient.

10 Claims, 5 Drawing Sheets

BIRD FEEDING MONITORING HOUSE

TECHNICAL FIELD

The present utility model relates to the technical field of bird feeders, and in particular to a bird feeding monitoring house.

BACKGROUND

With the development of society, people's living standard is getting higher and higher, and the consciousness of protecting the environment and caring for wild animals also improves gradually. Among numerous wild animals, hummingbirds are small in size, scaly in feather, bright in color, and sparkling in rainbow color or metallic luster, which are very beautiful, so that the hummingbirds are deeply loved by people.

The existing bird feeder is usually placed in the field, hung or fixed on a tree. After long-time use, a lens of a camera device of the bird feeder is easily dirty, and the battery of the camera device is exhausted, therefore, the lens needs to be cleaned and the battery is replaced regularly; in addition, the camera device of the bird feeder is usually integrated with the main body of the bird feeder, when the dirt is cleaned and the battery is replaced, the entire bird feeder needs to be removed, which is very inconvenient and not very practical.

SUMMARY

A primary objective of the present utility model is to provide a bird feeding monitoring house, which aims at improving the practicability of a bird feeder, and making it easier for a user to clean dirt from a camera device and replace a battery.

In order to achieve the above objective, the present utility model provides a bird feeding monitoring house, which comprises a main body and a feeding portion arranged under the main body, wherein a liquid storage area in communication with the feeding portion is formed in the main body, the main body is provided with a cavity having a shape adapted to a camera, the camera is detachably arranged in the cavity of the main body in a penetrating manner, and a photographing area of the camera comprises at least a part of the feeding portion.

Optionally, the main body and the camera are fixed through a sliding groove; or the main body and the camera are fixed through a clamp; or the main body and the camera are fixed through the deformation of a soft rubber at a gap; or the main body and the camera are fixed through a thread; or the main body and the camera are fixed through magnetic suction; or the main body and the camera are fixed by a buckle.

Optionally, the camera is provided with a convex or concave structure; and one side of the cavity is provided with a first limiting structure adapted to the convex or concave structure of the camera.

Optionally, a bendable clamping plate and an accommodating groove for accommodating the bendable clamping plate are arranged at one side of the cavity, and a second limiting structure is convexly arranged on the clamping plate; and the camera is provided with a third limiting structure corresponding to the second limiting structure in position, and when the camera is inserted into the cavity, the second limiting structure limits the third limiting structure to fix the camera.

Optionally, the camera comprises at least some or all of a lens, a PIR component, a microphone, and a wireless component.

Optionally, a focal length of the lens is less than 0.5 m.

Optionally, the lens is arranged to be inclined downwards.

Optionally, the feeding portion is provided with at least one hole for a bird to suck liquid.

Optionally, one side of the feeding portion is provided with a bird standing frame for a bird to stand.

Optionally, a photographing area of the camera further comprises the bird standing frame.

Optionally, a supply area is formed in the feeding portion, the supply area is in communication with the liquid storage area through an opening, and a height of the hole is not lower than that of the opening to prevent bees from sucking liquid.

Optionally, a water storage area is formed at a top end of the main body, and a hanging opening for hanging a rope is formed in the water storage area.

According to the present utility model, the camera is detachably arranged in the cavity of the main body in a penetrating manner. When the camera needs to be cleaned or the battery of the camera needs to be replaced, the camera only needs to be pulled out of the cavity without removing the main body from the hanging or installation position; and after camera cleaning or battery replacement is completed, the camera is inserted into the cavity again, so that the operation is simple, and the detachment is convenient;

in addition, sugar water in the liquid storage area is easy to deteriorate, mildew, and the like outdoors, and the present utility model has the advantages that the camera can be completely removed at any time, and the rest can be detached for cleaning or even high-temperature disinfection to kill bacteria; moreover, the camera is completely arranged in the cavity of the main body in a penetrating manner, which is more suitable for outdoor hanging; when the user accidentally makes a mistake or there is a furious storm, the entire house will fall to the ground to damage the main body or a housing of the feeding portion, in this case, the user only needs to replace the main body or the feeding portion, so that the damage to the high-value camera is avoided to the maximum extent.

BRIEF DESCRIPTION OF THE DRAWINGS

In order to more clearly illustrate the technical solutions in the embodiments of the present utility model or in the prior art, the drawings required to be used in the description of the embodiments or the prior art are briefly introduced below. It is obvious that the drawings in the description below are only some embodiments of the present utility model, and those of ordinary skill in the art can obtain other drawings according to structures illustrated in these drawings without creative efforts.

DESCRIPTIONS OF REFERENCE NUMERALS

Figure 1:
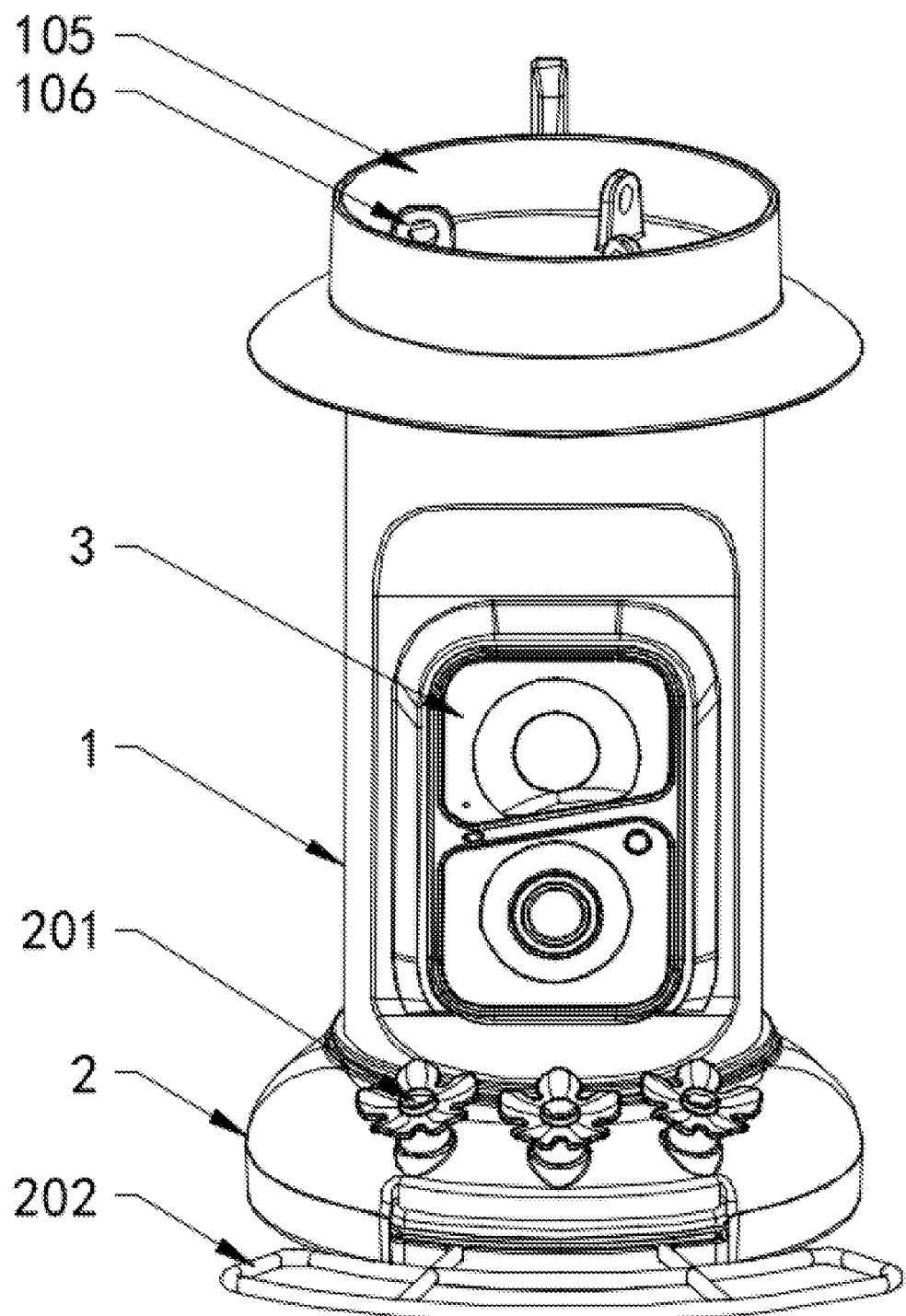
FIG. 1 is a perspective view of the present utility model.

1: main body; 2: feeding portion; 3: camera; 101: liquid storage area; 102: cavity; 103: clamping plate; 104: accommodating groove; 105: water storage area; 106: hanging opening; 201: hole; 202: bird standing frame; 203: supply area; 204: opening; 301: third limiting structure; 302: lens; and 1031: second limiting structure.

The realization of the objectives, the functional features, and the advantages of the present utility model will be further explained in conjunction with the embodiments and with reference to the drawings.

DETAILED DESCRIPTION OF THE EMBODIMENTS

The following clearly and completely describes the technical solutions in the embodiments of the present utility model with reference to the accompanying drawings in the embodiments of the present utility model. Apparently, the described embodiments are only a part rather than all of the embodiments of the present utility model. Based on the embodiments of the present utility model, all other embodiments obtained by those of ordinary skill in the art without creative efforts fall within the protection scope of the present utility model.

It should be noted that, if directional indications (such as upper, lower, left, right, front and rear) are involved in the embodiments of the present utility model, the directional indications are only used to explain the relative position relationships, the motion situations and the like between individual components under a certain pose (as shown in the drawings), and if the certain pose is changed, the directional indications are changed accordingly.

In addition, if there are descriptions relating to "first", "second" and the like in the embodiments of the present utility model, the descriptions of "first", "second" and the like are for descriptive purposes only and are not to be construed as indicating or implying relative importance thereof or implicitly indicating the quantities of technical features indicated. Thus, a feature defined by "first" or "second" may explicitly or implicitly include at least one such feature. In addition, "and/or" appearing herein is meant to include three parallel aspects, and taking "A and/or B" as an example, it includes aspect A, or aspect B, or both aspect A and aspect B. In addition, the technical solutions among various embodiments may be combined with each other, but the combination must be based on that it can be realized by those of ordinary skill in the art, and when the combination of the technical solutions is contradictory or cannot be implemented, such combination of the technical solutions should not be considered to exist, and is not within the protection scope of the present utility model.

At present, the common bird feeder is usually placed in the field, hung or fixed on a tree. After long-time use, a lens of a camera device of the bird feeder is easily dirty, and the battery of the camera device is exhausted, therefore, the lens needs to be cleaned and the battery is replaced regularly; in addition, the camera device of the bird feeder is usually integrated with the main body of the bird feeder, when the dirt is cleaned and the battery is replaced, the entire bird feeder needs to be removed, which is very inconvenient and not very practical.

In order to solve the above problems, the present utility model provides a bird feeding monitoring house, and FIGS. 1 to 5 are specific embodiments of the bird feeding monitoring house provided by the present utility model.

Figure 2:
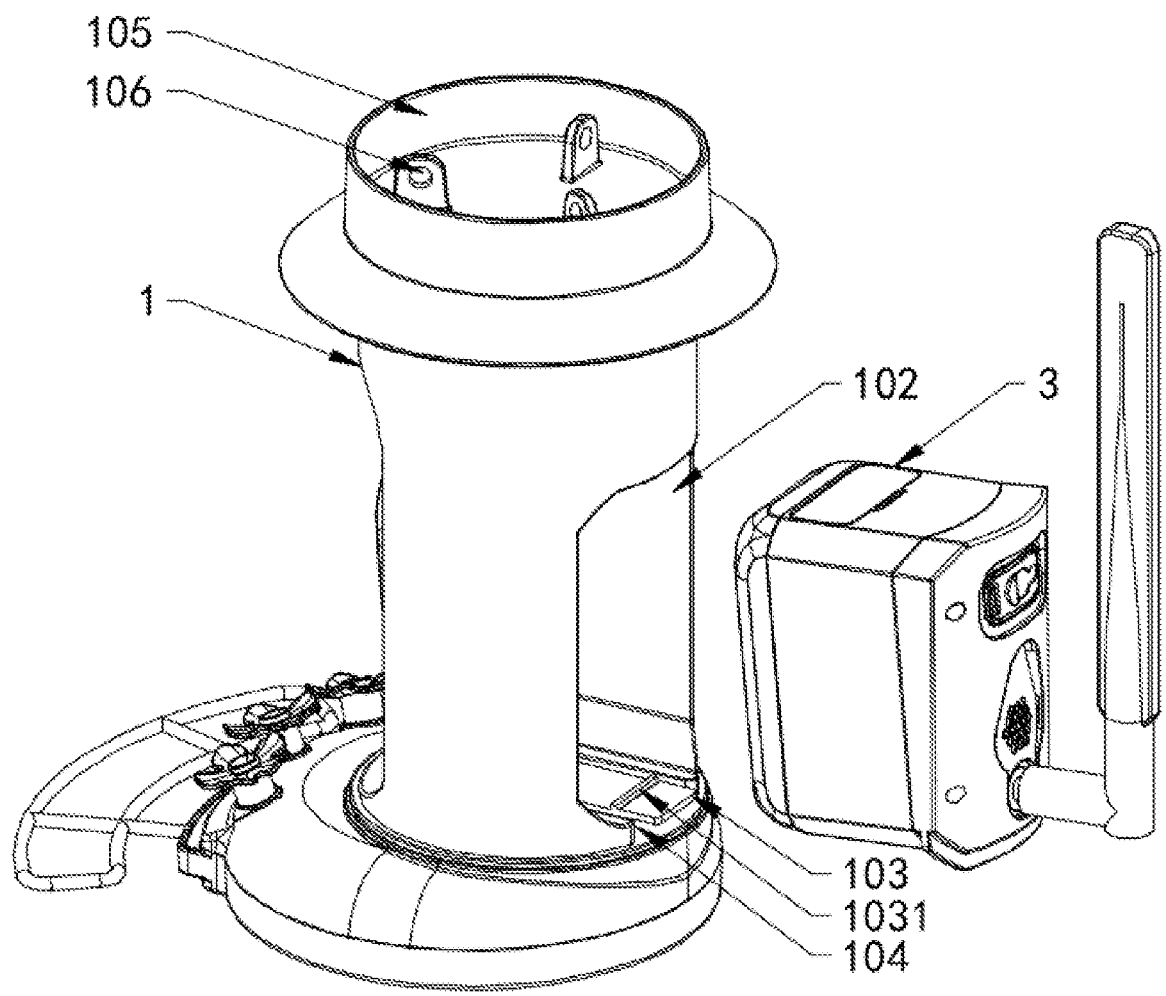
FIG. 2 is an exploded view a camera and a cover according to the present utility model.
Figure 5:
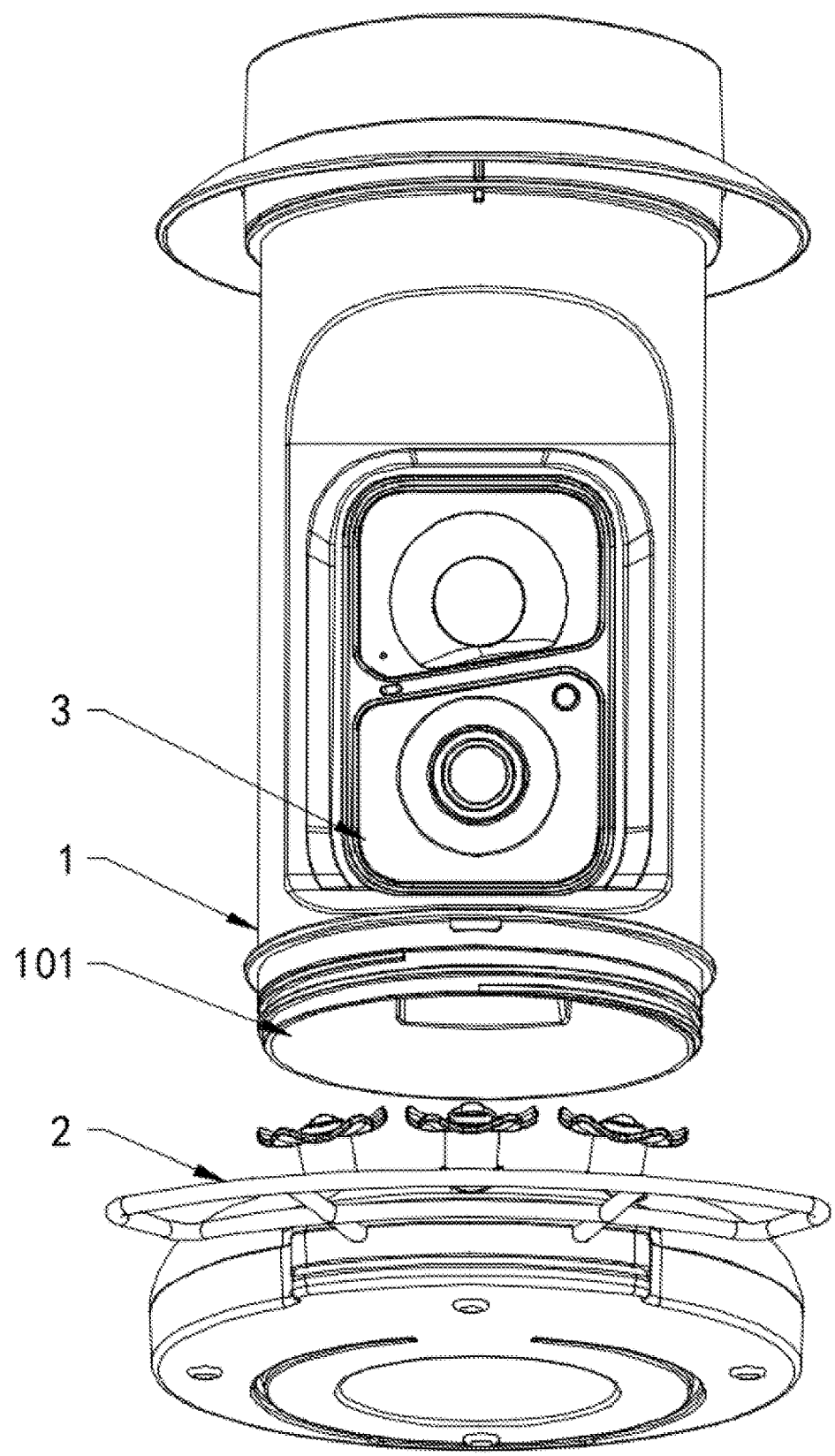
FIG. 5 is an exploded view of a main body and a feeding portion according to the present utility model.

Referring to FIGS. 1, 2, and 5, the bird feeding monitoring house comprises a main body 1 and a feeding portion 2 arranged under the main body 1, wherein a liquid storage area 101 in communication with the feeding portion 2 is formed in the main body 1, the main body 1 is provided with a cavity 102 having a shape adapted to a camera 3, the camera 3 is detachably arranged in the cavity 102 of the main body 1 in a penetrating manner, and a photographing area of the camera 3 comprises at least a part of the feeding portion 2.

According to the present utility model, the camera 3 is detachably arranged in the cavity 102 of the main body 1 in a penetrating manner. When the camera 3 needs to be cleaned or the battery of the camera needs to be replaced, the camera 3 only needs to be pulled out of the cavity 102 without removing the main body 1 from the hanging or installation position; and after camera cleaning or battery replacement is completed, the camera 3 is inserted into the cavity 102 again, so that the operation is simple, and the detachment is convenient.

In addition, sugar water in the liquid storage area 101 is easy to deteriorate, mildew, and the like outdoors, and the present utility model has the advantages that the camera 3 can be completely removed at any time, and the rest can be detached for cleaning or even high-temperature disinfection to kill bacteria; moreover, the camera 3 is completely arranged in the cavity 102 of the main body 1 in a penetrating manner, which is more suitable for outdoor hanging; when the user accidentally makes a mistake or there is a furious storm, the entire house will fall to the ground to damage the main body 1 or a housing of the feeding portion 2, in this case, the user only needs to replace the main body 1 or the feeding portion 2, so that the damage to the high-value camera 3 is avoided to the maximum extent.

In order to avoid the problem that the bird feeding monitoring house shakes due to the influence of the environment, such as wind, and the camera 3 is separated from the cavity 102, the camera 3 is further fixed to the main body 1. It should be noted that the specific fixing manner of the main body 1 and the camera 3 is not limited herein, for example, the main body 1 and the camera 3 are fixed through a sliding groove, or the main body 1 and the camera 3 are fixed through a clamp, or the main body 1 and the camera 3 are fixed through the deformation of a soft rubber at a gap, or the main body 1 and the camera 3 are fixed through a thread, or the main body 1 and the camera 3 are fixed through magnetic suction, or the main body 1 and the camera 3 are fixed by a buckle. The fixing manner of the main body 1 and the camera 3 includes but is not limited to the above-listed manners, other common fixing manners not listed are also within the protection scope of the present utility model as long as the camera 3 and the main body 1 can be fixed.

Figure 4:
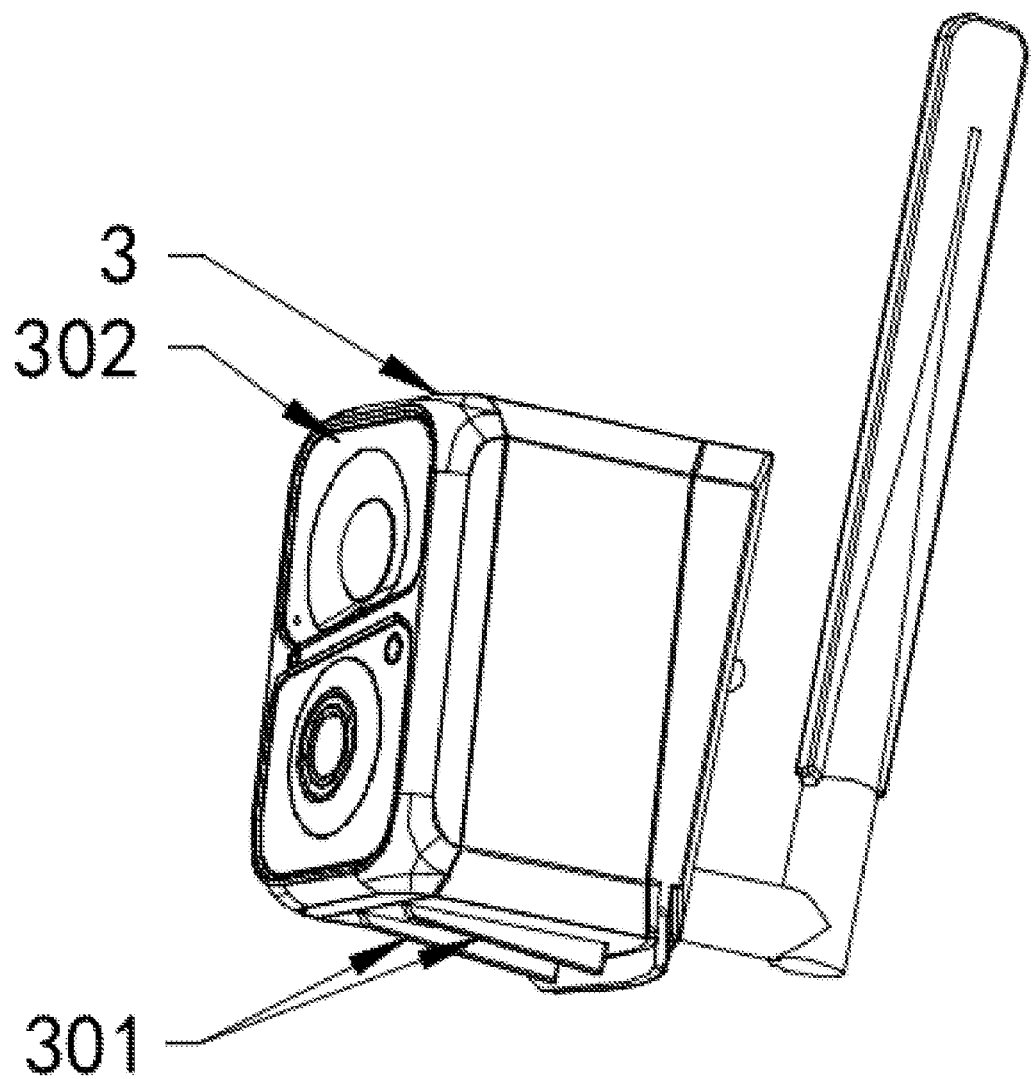
FIG. 4 is a perspective view of a camera according to the present utility model.

Referring to FIGS. 2 and 4, as a preferred embodiment, the camera 3 and the main body 1 are fixed in a clamping fixing manner. Specifically, a bendable clamping plate 103 and an accommodating groove 104 for accommodating the bendable clamping plate 103 are arranged on one side of the cavity 102, a second limiting structure 1031 is convexly arranged on the clamping plate 103, and a third limiting structure 301 corresponding to the second limiting structure 1031 is arranged on the camera 3. When the camera 3 is inserted into the cavity 102, the second limiting structure 1031 limits the third limiting structure 301 to fix the camera 3, and when the camera 3 needs to be detached, the clamping plate 103 is pressed to bend the clamping plate 103 into the accommodating groove 104. In this case, the second limiting structure 1031 does not interfere with the third limiting structure 301, that is, the limit of the second limiting structure 1031 on the third limiting structure 301 is released, and then the camera 3 can be pulled out. Further, the second limiting structure 1031 is inclined toward a rear side, and the third limiting structure 301 is also inclined, so that when the camera 3 is inserted into the cavity 102, the camera 3 can press the clamping plate 103 into the accommodating groove 104 without pressing the clamping plate 103, which is convenient to operate.

Further, in order to limit the camera 3 installed in the cavity 102, the convex or concave structure is arranged on the camera 3, and one side of the cavity 102 is provided with a first limiting structure adapted to the convex or concave structure of the camera 3. With the adaption of the convex or concave structure to the first limiting structure, when a size of a housing of the camera 3 or the cavity 102 is deviated during machining, the camera 3 can still be installed in the cavity 102 and is ensured not to slightly shake in the cavity 102, so that the machining requirement can be reduced, that is, the machining cost is reduced; in addition, the installation of the camera 3 and the main body 1 is more stable, so that the user can conveniently determine the installation direction of the camera 3.

Referring to FIG. 4, the camera 3 comprises at least some or all of a lens 302, a PIR component, a microphone, and a wireless component. The PIR component can detect a bird, which can be fed back to the camera 3 for photographing, and the wireless component can feed back the detection to the user, and the microphone can collect the sound of the bird.

A focal length of the lens 302 is less than 0.5 m, and the focal length of the lens 302 can be set in an adjustable manner, so that focusing can be performed according to a position of a bird before delivery or in use, and a clearer picture or video can be obtained.

The lens 302 is arranged to be inclined downwards. Since the camera 3 is installed on the main body 1 and the feeding portion 2 is arranged at a lower side of the main body 1, in order to make the camera 3 have a better photographing effect, the lens 302 is inclined downwards and arranged to be aligned with the feeding portion 2, so that the feeding portion 2 is located in the middle of the photographing range of the camera 3.

Further, a water storage area 105 is formed on a top end of the main body 1, a hanging opening 106 for hanging a rope is formed in the water storage area 105, the bird feeding monitoring house can be hung in the wild such as on a tree by the hanging opening 106 and the rope, and water is added to the water storage area 105 to submerge the hanging opening 106 to form an ant-preventing structure, so that insects that climb down through the rope must pass through the water surface in the water storage area 105 to climb to the feeding portion 2 below, and the insects will choose to give up; and if a first opening 105 is formed on the top end of the main body 1, the water storage area 105 and the hanging opening 106 can be formed on the cover 105.

Figure 3:
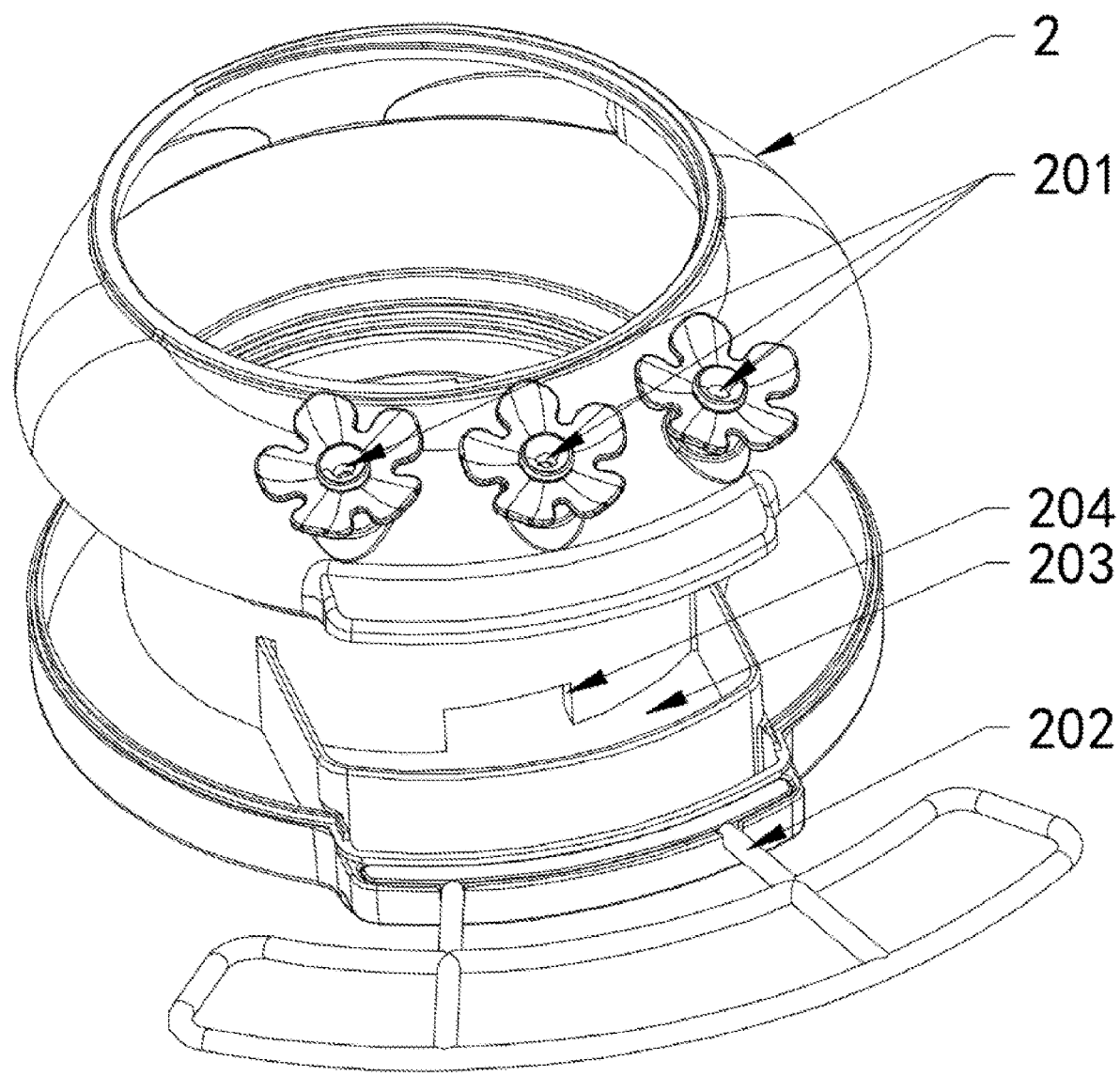
FIG. 3 is an exploded view of a feeding portion according to the present utility model.

Referring to FIG. 3, the feeding portion 2 is provided with at least one hole 201, the hole 201 is configured for the bird to suck the liquid. With the arrangement of the hole 201, the mouth of the bird can suck the liquid through the hole 201, however, the other animals are more difficult to suck. In addition, the hole 201 is arranged such that the contact between the liquid and the air is reduced, thereby reducing the evaporation speed of the liquid.

One side of the feeding portion 2 is provided with a bird standing frame 202 for the birds to stand, and the bird standing frame 202 is convenient for the birds to stand when sucking. The hummingbirds do not need to flap wings to fly when sucking, so that the quality of the photos taken by the camera 3 is higher. Further, the photographing area of the camera 3 further comprises the bird standing frame 202, so that the birds standing on the bird standing frame 202 can be photographed by the camera 3.

The feeding portion 2 is formed with a supply area 203, the supply area 203 is communicated with the liquid storage area 101 through an opening 204, a height of the hole 201 is not lower than that of the opening 204 to prevent bees from sucking the liquid, and a difference between the height of the hole 201 and the height of the opening 204 is formed, so that mouthparts of insects such as bees are not long enough to suck the liquid in the supply area 203 through the hole 201.

Optionally, in order to facilitate a user to clean the inside of the liquid storage area 101, a through opening penetrating to the liquid storage area 101 is formed at one side of the main body 1, and a cover is connected to the through opening.

The above mentioned contents are only optional embodiments of the present utility model and are not intended to limit the patent scope of the present utility model, and under the inventive concept of the present utility model, the equivalent structural transformations made by using the contents of the specification and the drawings of the present utility model, or direct/indirect applications to other related technical fields, are all included in the patent protection scope of the present utility model.

What is claimed is:

1. A bird feeding monitoring house, comprising:
   a main body and
   a feeding portion arranged under the main body, wherein a liquid storage area in communication with the feeding portion is formed in the main body, the main body is provided with a cavity having a shape adapted to a camera, the camera is detachably arranged in the cavity of the main body in a penetrating manner, and a photographing area of the camera comprises at least a part of the feeding portion;
   wherein the feeding portion is provided with at least one hole for a bird to suck liquid; a supply area is formed in the feeding portion, the supply area is in communication with the liquid storage area through an opening, and a height of the at least one hole is not lower than a height of the opening to prevent bees from sucking liquid.

2. The bird feeding monitoring house according to claim 1, wherein the main body and the camera are fixed through a sliding groove; or
   the main body and the camera are fixed through a clamp; or
   the main body and the camera are fixed through the deformation of a soft rubber at a gap; or
   the main body and the camera are fixed through a thread; or
   the main body and the camera are fixed through magnetic suction; or
   the main body and the camera are fixed by a buckle.

3. The bird feeding monitoring house according to claim 1, wherein the camera is provided with a convex or concave structure; and one side of the cavity is provided with a first limiting structure adapted to the convex or concave structure of the camera.

4. The bird feeding monitoring house according to claim 3, wherein a bendable clamping plate and an accommodating groove for accommodating the bendable clamping plate are arranged at one side of the cavity, and a second limiting structure is convexly arranged on the clamping plate; and
the camera is provided with a third limiting structure corresponding to the second limiting structure in position, and when the camera is inserted into the cavity, the second limiting structure limits the third limiting structure to fix the camera.

5. The bird feeding monitoring house according to claim 1, wherein the camera comprises a lens and at least some or all of a PIR component, a microphone, and a wireless component.

6. The bird feeding monitoring house according to claim 5, wherein a focal length of the lens is less than 0.5 m.

7. The bird feeding monitoring house according to claim 5, wherein the lens is arranged to be inclined downwards.

8. The bird feeding monitoring house according to claim 1, wherein one side of the feeding portion is provided with a bird standing frame for a bird to stand.

9. The bird feeding monitoring house according to claim 8, wherein a photographing area of the camera further comprises the bird standing frame.

10. The bird feeding monitoring house according to claim 1, wherein a water storage area is formed at a top end of the main body, and a hanging opening for hanging a rope is formed in the water storage area.

\* \* \* \* \*